Patented Mar. 4, 1952

2,587,623

UNITED STATES PATENT OFFICE 2,587,623

ACYLATION OF DEXTRAN IN FORMAMIDE

Allene R. Jeanes and Carl A. Wilham, Peoria, Ill., assignors to the United States of America as represented by the Secretary of Agriculture No Drawing. Application January 16, 1951, Serial No. 206,286

4 Claims. (Cl. 260—234)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the preparation of dextran esters, particularly dextran acetate. More particularly, it relates to a novel method for the acetylation of dextrans whereby a novel improved form of dextran acetate is produced.

Dextran acetate has various uses such as in the film and coating arts. That produced by prior methods may be transformed to a brittle transparent resin. Even though the industrial possibilities of dextran acetates have been recognized, their usefulness has been considerably restricted by their insolubility in organic solvents and their tendency to decompose on long standing.

Heretofore, dextran acetate has usually been prepared by acetylating dextran employing as catalysts mineral acids such as sulfuric acid, phosphoric and the like. The products so produced are rather intractable materials, insoluble in organic solvents and characterized by undesirable instability on long standing. The prior conditions of esterification induce degradation of the dextran molecule thus rendering coatings, films, or other articles made therefrom subject to physical and chemical attack.

We have discovered that dextran acetate, if made under specific controlled conditions, is produced in an essentially undegraded, macromolecular form which is unique, and which possesses peculiar advantageous stability and solubility characteristics. For example, our product does not change with age, is remarkably resistant to physical and chemical attack, and is easily soluble in tetrachloroethane, a commercially obtainable organic solvent. Moreover, by our process complete esterification to the dextran triester is readily effected without the application of external heat to the reaction.

According to the present invention, dextran is acetylated by means of acetic anhydride in formamide as a reaction medium, the reaction being catalyzed by pyridine. In practice, it is convenient to dissolve the dextran in formamide and then acetylate by adding acetic anhydride and pyridine, the amount of acetic anhydride preferably being in excess of the amount theoretically required for the degree of acetylation desired. For example, for complete acetylation, we may employ up to 10 or more times the amount theoretically required.

The acetylation occurs at temperatures of 15°–30° C. over a substantial period of time, and the completeness of acetylation may be conveniently controlled simply by controlling the time of reaction. For convenience, we prefer to employ temperatures of 20°–25° C. If permitted to go to completion, i. e., for a period of about 18 hours, the yield of dextran acetate is practically quantitative. The acetylation may be carried out completely to the tri-acetate in one step, provided sufficient reagents are employed. However, a series of step-wise acetylations, each employing lesser amounts, is within the purview of this invention.

The amount of formamide required is approximately 5–20 parts per part of dextran, dry basis. The amount of pyridine may vary over a wide range. In our process, pyridine functions not only as a catalyst for the acetylation, but also as a means of controlling the viscosity of the reaction mixture. Practically, sufficient pyridine is added to produce a reaction mixture that may be stirred. This amount may vary over a wide range; for example, it may correspond approximately to the amount of formamide used.

Our acetylation method is applicable to dextrans produced by the usual microbiological or enzymic syntheses. It may be applied to the crude hydrated gum as recovered from microbiological culture liquors, as described by Jeanes et al. in J. Biol. Chem. 17, 603, 1948. It may also be applied to technically purified dextran or to highly purified dextrans which are likewise described by Jeanes et al. It is, moreover, applicable to high viscosity, autolyzed or calcium carbonate buffered, dextrans, likewise described by Jeanes et al. Where a highly pure product is desired, we prefer to use purified dextran as a starting material, although a pure product may be obtained from any of the raw materials mentioned above.

The product of our invention may be recovered from the acetylation mixture by drowning in water, followed by filtering and centrifugation. A quantitative yield of crude product is obtained after washing with water and drying in air. Slight coloration in the product may be removed when necessary by washing with ethanol.

The following specific examples illustrate the invention.

*Example 1*

One part by weight of dehydrated dextran, containing about 12 percent moisture, is mechanically stirred to homogeneity with 15 parts of formamide. Fifteen parts of pyridine are then added with stirring, whereupon 12 parts of acetic anhydride are added slowly. The solution is stirred for about 18 hours at 20°–30° C. The reaction mixture is poured slowly into about five volumes of water, and the dextran acetate separates as an insoluble precipitate. It is removed by centrifugation and washed with water. This product is slightly colored, finely divided powder that may be rendered nearly colorless by finally washing with ethanol. The product analyzed 44.8 percent acetyl, the theoretical required for dextran triacetate. It was completely soluble in tetrachloroethane and developed no odor of acetic acid on standing in a closed container for nine months.

The foregoing procedure may be carried out on the crude dextran gum recovered directly from *Leuconostoc mesenteroides* fermentations. This may be done either on the dehydrated crude gum or on the hydrated gum. The following example illustrates our method as applied to hydrated gummy dextran.

*Example 2*

One part of hydrated gummy dextran, wet with alcohol and water, and containing about .52 percent moisture, is mechanically stirred to homogeneity with 14 parts of formamide. Fifteen parts of pyridine are then added, with stirring, followed by the gradual addition of 13 parts of acetic anhydride. The solution is stirred for about 18 hours at 20°–30° C. At the end of the reaction, the reaction mixture is poured slowly into about 5 volumes of water, and the dextran acetate recovered as in Example 1. The product analyzed 44.9 percent acetyl and was completely soluble in tetrachloroethane.

*Example 3*

The procedure of Example 2 was repeated employing dehydrated dextran instead of the hydrated material used in that example. Amounts of reagents were approximately the same, and the conditions and times of reaction were the same. The product analyzed 44.6 percent acetyl and was completely soluble in tetrachloroethane.

As may be seen from the foregoing examples, the amount of acetic anhydride employed was considerably in excess of that required by theory for the triacetate. As explained previously, however, the acetylation may be carried out step-wise using less of acetic anhydride for each step.

We claim:

1. The method comprising dissolving dextran in formamide and thereafter acetylating the dissolved dextran with acetic anhydride in the presence of pyridine at a temperature of about from 15° C. to 30° C. to produce dextran triacetate characterized in that it is soluble in tetrachloroethane.

2. The method comprising dissolving dextran in formamide and thereafter acetylating the dissolved dextran with acetic anhydride in the presence of pyridine at a temperature of about from 15° C. to 30° C. to produce dextran triacetate characterized in that it is soluble in tetrachloroethane, the amount of acetic anhydride used being in excess of that theoretically required to form dextran triacetate.

3. The method comprising dissolving dextran in formamide and thereafter acetylating the dissolved dextran with acetic anhydride in the presence of pyridine at a temperature of about from 15° C. to 30° C. to produce dextran triacetate characterized in that it is soluble in tetrachloroethane, the amount of acetic anhydride used being in excess of that theoretically required to form dextran triacetate and the amount of pyridine used being sufficient to render the reaction mixture capable of being stirred.

4. The method comprising dissolving dextran in formamide, the amount of formamide used being about from 5 to 20 parts per part of dextran on a dry basis, and thereafter acetylating the dissolved dextran with acetic anhydride in the presence of pyridine at a temperature of about from 15° C. to 30° C. to produce dextran triacetate characterized in that it is soluble in tetrachloroethane, the amount of acetic anhydride used being in excess of that theoretically required to form dextran triacetate and the amount of pyridine used being sufficient to render the reaction mixture capable of being stirred.

ALLENE R. JEANES.
CARL A. WILHAM.

REFERENCES CITED

The following references are of record in the file of this patent:

UNITED STATES PATENTS

| Number | Name | Date |
|---|---|---|
| 2,538,903 | Gaver et al. | Jan. 23, 1951 |

OTHER REFERENCES

Fowler et al., Canadian Jour. Research, V. 15, 1937, p. 487, 491.